May 28, 1946.  J. E. RAYMOND  2,401,016
VAPOR-ELECTRIC DEVICE
Filed Aug. 24, 1943

WITNESSES:
Alice L. Howell
James F. Young

INVENTOR
John E. Raymond.
BY S. A. Stricklett
ATTORNEY

Patented May 28, 1946

2,401,016

UNITED STATES PATENT OFFICE 2,401,016

VAPOR-ELECTRIC DEVICE

John E. Raymond, Hamilton, Ontario, Canada, assignor to Westinghouse Electric Corporation, East Pittsburgh, Pa., a corporation of Pennsylvania Application August 24, 1943, Serial No. 499,869

5 Claims. (Cl. 315—263)

My invention relates to a vapor-electric device and particularly to a firing system for simultaneously energizing a plurality of parallel-connected vapor-electric valves of the make-alive type.

In the operation of make-alive type valves for transferring large amounts of energy, it has heretofore been customary to provide a plurality of parallel-connected valves for each phase terminal of the rectifier transformer and to utilize so-called anode balance coils to equalize the current between the various parallel valves. In operation, there is a certain amount of noise and power loss because one of the parallel-connected valves is frequently fired slightly ahead of the remaining valves for various reasons. It has heretofore been customary either to provide a separate firing circuit for each of the parallel valves or to utilize balance coils to divide the exciting current between the various make-alive electrodes. Because of certain inaccuracies in manufacturing, either of these systems frequently produces one of the firing impulses a small fraction of a cycle ahead of the remaining firing impulses.

It is an object of my invention to provide an impulsing system in which the firing impulses to all parallel-connected valves are produced simultaneously by means of a saturable reactor or reactors cross connected with all of the firing circuits so that all circuits are controlled simultaneously regardless of any slight inequality of peak potential or other electrical value which might tend to shift the instant of firing.

It is a further object of my invention to provide a firing circuit in which a single saturable reactor may be utilized to control a plurality of impulsing circuits and thus reduce the quantity of the high quality steel necessary to control the firing impulses of a plurality of valves.

Figure 1:
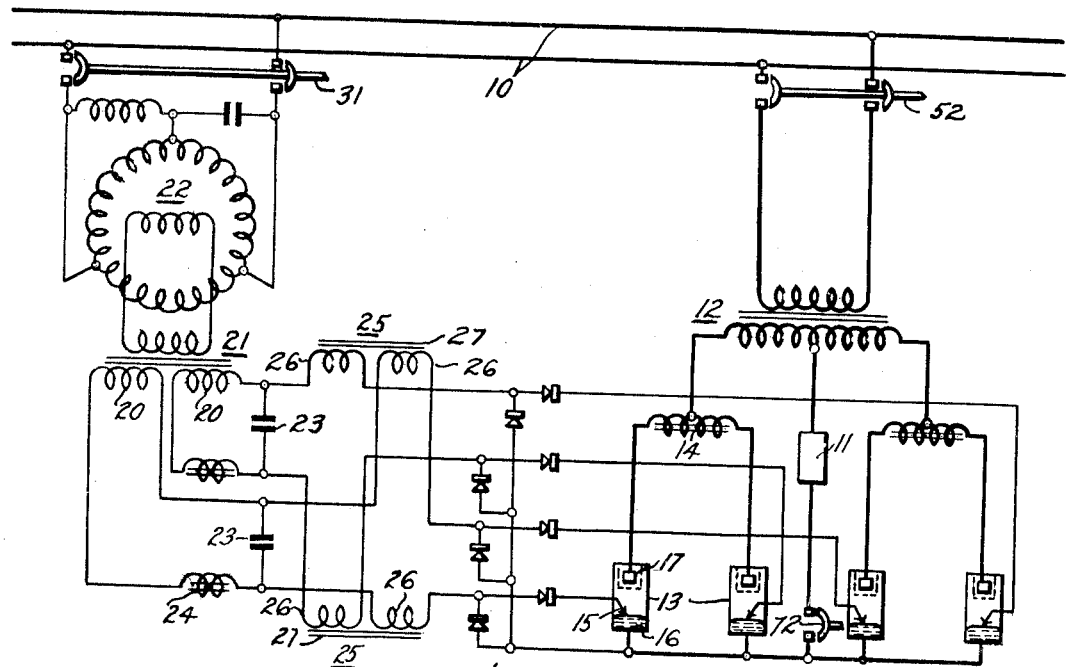
Figure 2:
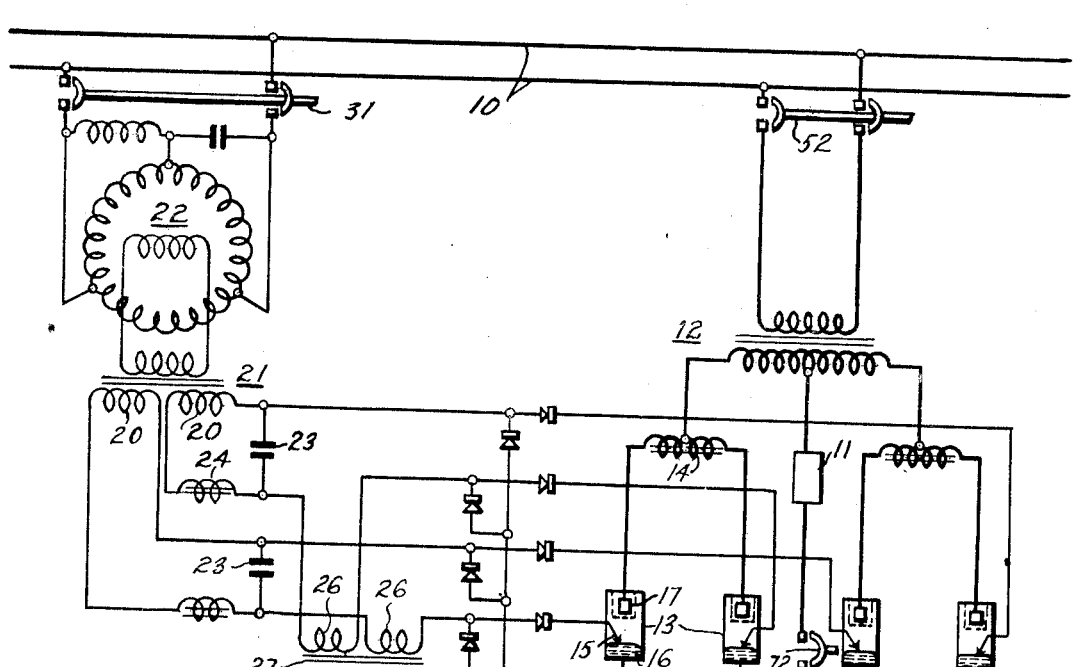

Other objects and advantages of my invention will be apparent from the following detailed description, taken in conjunction with the accompanying drawing, in which:

Figure 1 is a schematic illustration of the simplified converter according to my invention; and Fig. 2 is a similar view showing a preferred embodiment according to my invention.

In the exemplary embodiments of my invention, an alternating-current circuit 10 is connected to a direct-current load circuit 11 by means of a suitable rectifier transformer 12 and the flow of current through the transformer 12 is controlled by means of vapor-electric valves 13 connected to the phase terminals of the transformer 12. In order to carry relatively large current, a plurality or group of vapor-electric valves 13 are connected to each of the phase terminals and suitable balance coils 14 provided for insuring proper distribution of current between the valves 13.

For simplicity of illustration, I have disclosed the alternating-current circuit 10 as of the so-called single-phase type although in normal operation this alternating-current circuit 10 will be polyphase. Likewise, I have shown the parallel valve group as comprising two valves 13. However, it is apparent that any number of valves 13 may be utilized in parallel. For operating reasons, I prefer to utilize a circuit breaker 52 between the alternating-current circuit 10 and the rectifier transformer 12 and to use a direct-current circuit breaker 72 in series with the direct-current load circuit 11.

The firing system for controlling the valves 13 comprises a make-alive electrode 15 in contact with the cathode 16 of each of the valves 13 while the anodes 17 are connected to the balance coils 14 which are in turn connected to the phase terminals of the transformer 12. Any suitable source of firing potential may be provided. Herein I have shown this source as a plurality of secondary windings 20 on a control transformer 21 which is energized preferably through a phase shifting device 22 from any suitable source, such as the alternating-current circuit 10. In order to reduce the power requirements of the sources 20, it is usually fortified by means of a condenser 23 in shunt across the terminals of the secondary winding 20, the charge of the condenser 23 being controlled by a suitable impedance 24, preferably in the form of a linear reactor.

Current flow from the sources 20 to the make-alive electrodes 15 is controlled by a non-linear impedance 25 in the form of a saturable reactor. In order to insure that the current flows simultaneously in all of the parallel firing circuits, each of the connections from the sources 20 to the make-alive electrodes 15 includes coils 26 which are additively wound on the core 27 of the saturable reactor 25. Thus all of the coils 26 cooperate to produce saturation of the reactor 25 and until such time as the core 27 of reactor 25 is saturated, current in any of the coils 26 will be of very low value regardless of the fact that one or more of the sources 20 may reach its firing potential slightly ahead of the remaining sources. However, as soon as the core 27 of the saturable reactor 25 reaches the saturation point, the current will be simultaneously released through all of the firing circuits so that all of the make-alive electrodes 15 will be simultaneously energized, thereby assuring substantially simultaneous pick-up of the arch in each of the parallel operating valves 13 and consequent reduction of power losses in the anode balance coils 14 and other portions of the circuit.

In the modification according to Fig. 1, I have shown saturable reactors 25 for each of the parallel firing circuits with the coils 26 cross connected so that each circuit must cooperate with every other circuit to saturate all of the reactors 25 before current may flow in any of the parallel circuits.

In the preferred embodiment of my invention according to Fig. 2, I prefer to use a single saturable reactor 25 or rather a single saturable magnetic circuit 27 in which a plurality of coils 26 corresponding to the parallel circuits are additively employed to produce the necessary saturating flux. Since a very high quality steel must be utilized for the core 27 of the saturable reactor 25, I find that this method reduces the cost of the system by reducing the amount of high quality steel in addition to attaining the desired unity of action. In order to conserve power and reduce the cost of the excitation system, each source or secondary winding 20 is utilized to fire not only a group of valves 13 but also the alternately conducting group of valves 13. This is possible by utilizing a polarity responsive network such as shown in copending application Serial No. 402,888, filed July 31, 1941, by William E. Pakala and Henry C. Myers, and assigned to the same assignee as the present application.

For purposes of illustration, I have shown and described specific embodiments of my invention but it will be apparent that changes and modifications can be made therein without departing from the true spirit of my invention or the scope of the appended claims.

I claim as my invention:

1. In a vapor-electric device having a plurality of parallel operating valves, a firing system for securing substantially simultaneous excitation of the valves comprising a make-alive electrode for each of said valves, a source of exciting current for each of said make-alive electrodes, connections from said sources to the respective make-alive electrodes, a coil in each of said connections, said coil being associated with a common saturable magnetic core.

2. An electric current conversion system interconnecting two electric circuits, at least one of which is an alternating-current circuit comprising transformer means connected to both circuits, electric valve means controlling the flow of energy through said transformer means, said valve means being connected in a plurality of alternately conducting valve groups, each valve group containing a plurality of parallel connected valves, a make-alive electrode in each of said valves, a source of exciting current including a transformer having a plurality of secondary windings corresponding to the number of valves of a valve group, connections from said secondary windings to the respective make-alive electrodes and a saturable magnetic core interlocking said connections to control current flow therein.

3. An electric current conversion system interconnecting two electric circuits, at least one of which is an alternating-current circuit comprising transformer means connected to both circuits, electric valve means controlling the flow of energy through said transformer means, said valve means being connected in a plurality of alternately conducting valve groups, each valve group containing a plurality of parallel connected valves, a make-alive electrode in each of said valves, a source of exciting current including a transformer having a plurality of secondary windings corresponding to the number of valves of a valve group, connections from said secondary windings to the respective make-alive electrodes, a saturable magnetic core interlocking said connections to control current flow therein, connections from said secondary windings to the respective valves of an alternatively conducting valve group and polarity responsive means for selectively applying the exciting current to the make-alive electrodes of one or the other of the valve groups.

4. An electric current conversion system comprising a vapor-electric converter having a plurality of groups of alternately conducting valves, means for substantially simultaneously energizing all the valves of a group including a control electrode in each of said valves, a source of excitation current for each of said control electrodes, said sources being substantially in phase, connections from said sources to the respective control electrodes, saturable magnetic means linked with all of said connections for controlling the flow of current from said sources to said control electrodes.

5. An electric translating system connecting two dissimilar electric circuits at least one of which is an alternating current circuit comprising at least two groups of alternatively operating valves all of the valves of a group operating substantially in unison, a firing system for securing simultaneous starting of all of the valves of a group, said firing system including a make-alive electrode in each of said valves, a source of control current for each pair of valves one of said pair being in one group and the other in the alternately conducting group, connections from said source to said make-alive electrodes and a saturable magnetic circuit interlinking all of said connections.

JOHN E. RAYMOND.